United States Patent Office 3,725,201
Patented Apr. 3, 1973

3,725,201
MANUFACTURE OF URIDINE-5-DIPHOSPHO-GLUCURONIC ACID
Tsunetake Sugimori and Yoji Tsukada, Kyoto, and Yasuhiko Tazuke, Osaka, Japan, assignors to Marukin Shoyu Company, Limited, Uchinomi-cho, Shozu-gun, Kagawa-ken, Japan
No Drawing. Filed Sept. 8, 1971, Ser. No. 178,781
Int. Cl. C12d 13/06
U.S. Cl. 195—28 N                                    7 Claims

ABSTRACT OF THE DISCLOSURE

A process for manufacturing uridine-5'-diphosphoglucuronic acid which comprises cultivating a strain belonging to the genus Bacillus which is capable of producing uridine-5'-diphosphoglucose dehydrogenase to produce uridine-5'-diphosphoglucose dehydrogenase and reacting the resultant uridine-5'-diphosphoglucose dehydrogenase with uridine-5'-diphosphoglucose to produce uridine-5'-diphosphoglucuronic acid.

---

The present invention relates to a process for manufacturing uridine - 5'-diphosphoglucuronic acid (hereinafter referred to as "UDP-glucuronic acid").

UDP-glucuronic acid is a physiologically important substance which serves as a factor participating in detoxification through conjugation with glucuronic acid, one of the detoxifying activities of liver. It is also important as a cofactor relating to the synthesis in the living body of polysaccharide including glucuronic acid.

UDP-glucuronic acid has been extracted directly from the liver of animals or prepared by reacting uridine-5'-diphosphoglucose dehydrogenase (hereinafter referred to as "UDP - glucose dehydrogenase") likewise extracted from animals with uridine-5'-diphosphoglucose (hereinafter referred to as UDP-glucose) in the presence of nicotine adenine dinucleotide (hereinafter referred to as "NAD"). However, such method of deriving UDP-glucuronic acid from the organ of animals is subject to the limitation on the sources and it is cumbersome to procure them, hence almost impossible to practice for mass production.

It is also known to prepare UDP-glucose dehydrogenase from the cultures of microorganisms. In this respect, it has been reported that the dehydrogenase can be derived from the four strains of *Cryptococcus laurentii*, *Streptococcus pneumoniae*, *Aerobacter aerogenes* and *Escherichia coli*. However, the first-mentioned two strains are pathogenic and the UDP-glucose dehydrogenase prepared from all of the four strains requires troublesome procedure for purification, without which an objectionable side reaction would be bound to take place to cut off the pyrophosphoric acid bond in UDP-glucose, this making it impossible to carry out a reaction for a long period of time. For these reasons, the enzymes produced from the above-mentioned four strains are not utilized in practice for the manufacture of UDP-glucuronic acid.

An object of the present invention is to provide an industrially advantageous process for manufacturing UDP-glucuronic acid from UDP-glucose dehydrogenase prepared by cultivating non-pathogenic microorganisms.

Another object of this invention is to provide a process for manufacturing UDP-glucuronic acid with great ease from crude UDP-glucose dehydrogenase as prepared by cultivating microorganisms, without employing a cumbersome purifying procedure.

Still another object of this invention is to provide a process which makes it possible to obtain UDP-glucuronic acid without undesired side reaction, using UDP-glucose dehydrogenase prepared from microorganisms.

These and other objects of this invention will become more apparent from the following description.

The process for manufacturing UDP-glucuronic acid in accordance with the present invention comprises cultivating a strain belonging to the genus Bacillus which is capable of producing UDP-glucose dehydrogenase to produce UDP-glucose dehydrogenase and reacting the resultant UDP-glucose dehydrogenase with UDP-glucose to produce UDP-glucuronic acid.

The researches by the present inventors have shown that certain nonpathogenic bacteria belonging to the genus Bacillus, a group entirely distinct from the aforementioned four strains capable of producing UDP-glucose dehydrogenase, can give UDP-glucose dehydrogenase; that the dehydrogenase derived therefrom can be reacted in its crude form with UDP-glucose, free of undesired side reaction, even without any cumbersome purifying procedure; and that the reaction, being thus free of side reaction, permits a reaction to be continued over a prolonged period of time, ensuring selective production of UDP-glucuronic acid and mass production on industrial scale.

The bacteria of the genus Bacillus capable of producing UDP-glucose dehydrogenase and used in accordance with this invention are non-pathogenic and include, for example, strains represented by *Bacillus licheniformis* and *Bacillus cereus*, the representative thereof being given in Table 1. These strains are known and registered with JFCC (The Japanese Federation of Culture Collections of Microorganisms) and available to public. Listed in Table 1 are the names of the strains, Deposition Numbers and Depositories belonging to JFCC.

TABLE 1

| Strains | Deposition number | Depository |
|---|---|---|
| Bacillus licheniformis IAM 11054 | IAM 11054 | I.A.M. |
| Bacillus licheniformis NIAH 157 | NIAH 157 | N.I.A.H. |
| Bacillus licheniformis AHU 1531 | AHU 1531 | A.H.U. |
| Bacillus cereus IFO 3001 | IFO 3001 | I.F.O. |
| Bacillus licheniformis NIAH 215 | NIAH 215 | N.I.A.H. |
| Bacillus licheniformis AHU 1532 | AHU 1532 | A.H.U. |

NOTE.—I.A.M.=Institute of Applied Microbiology, University of Tokyo, Tokyo, Japan; N.I.A.H.=National Institute of Animal Health Ministry of Agriculture and Forestry, Tokyo, Japan; A.H.U.=Faculty of Agriculture, Hokkaido University, Sappro-shi, Japan; I.F.O.= Institute for Fermentation, Osaka, Osaka-shi, Japan.

This invention uses as a starting material UDP-glucose dehydrogenase produced by cultivation of the above-mentioned strains belonging to the genus Bacillus. Cultivation is conducted under usual conditions that will favor the growth of the strains. As in conventional practice, the culture medium is prepared from a carbon source such as glucose, fructose, sucrose, starch, citrate, etc. and a nitrogen source such as corn steep liquor, peptone, meat extract, yeast extract, amino acids, ammonium salts, nitrates, etc. Where desired, inorganic salts such as phosphates, NaCl, $K_2SO_4$, $MgSO_4$ and the like may further be added. Cultivation may be conducted by any desired aerobic method employed for bacteria in general such as shaking culture, submerged culture, or the like.

The UDP-glucose dehydrogenase thus prepared by cultivation is used in its crude form and there is no need to employ any cumbersome steps of purification. Thus, the desired UDP-glucutironic acid can be selectively obtained from the crude material without being accompanied by side reaction. Accordingly, raw bacteria as separated from the culture, dried bacteria obtained therefrom, or disintegrated bacteria can be used in the invention. The bacteria may be disintegrated for example with ultra sonic oscillation or mechanically with glass beads or the like.

UDP-glucose, another material to be used according to the process of this invention, can be readily produced from uridine-5′-monophosphoric acid and glucose under the action of dried yeasts. This process is disclosed, for example, by T. Tachikura et al. in "Journal of Fermentation Technology," vol. 46, page 957 (1968).

The reaction of this invention between UDP-glucose dehydrogenase and UDP-glucose to produce UDP-glucuronic acid usually proceeds at 20 to 45° C. As there is no need to heat or cool the reaction system, room temperature are the most preferable for the reaction. It is preferred that the reaction system be alkaline, and the reaction proceeds satisfactorily at a pH ranging from 7.5 to 10. The reaction may preferably be conducted with aeration or under other aerobic conditions. Generally, the reaction completes within a period of up to 20 hours, though longer reaction period may be applicable.

To promote the reaction, NAD and/or nicotine adenine dinucleotide phosphate (hereinafter referred to as "NADP"), may be added to the reaction system in an amount of 0.05 to 20 mM., preferably of 0.25 to 8 mM., whereby marked increases in the yield of UDP-glucuronic acid per unit hour are ensured. Of these, NAD is the more preferable.

The UDP-glucuronic acid thus produced is isolated with ease, for example, in the following manner. The resulting reaction mixture is treated with charcoal to permit the UDP-glucuronic acid and other uracil derivatives to be adsorbed to the charcoal, this being followed by elution with ammoniacal methanol and/or ammoniacal ethanol and subsequnt concentration. The concentrated eluant is then passed through a column of an ion exchange resin such as "Dowex 1" (trademark of ion exchange resin manufactured by Dow Chemical Co., U.S.A.) and developed with 0.01 N HCl containing 0.1 M of NaCl for fractionation. The resulting UDP-glucuronic acid-containing fraction is treated with charcoal again and then concentrated, whereby purified UDP-glucuronic acid is obtained in the form of ammonium salt. Since the reaction is free of side reaction such as decomposition of UDP-glucose used as material and UDP-glucuronic acid produced, it is easy to isolate and purify the product, and unreacted UDP-glucose can be used again as material free of trouble.

For a better understanding of this invention examples will be given below.

EXAMPLE 1

| | | |
|---|---|---|
| $(NH_4)_2SO_4$ | g./l | 2 |
| $K_2SO_4$ | g./l | 0.5 |
| $MgSO_4 \cdot 7H_2O$ | g./l | 0.2 |
| $FeSO_4 \cdot 7H_2O$ | mg./l | 2 |
| $Na_2HPO_4 \cdot 12H_2O$ | g./l | 2 |
| Yeast extract | g./l | 2 |
| Peptone | g./l | 5 |
| Glucose | g./l | 10 |

On 1 liter of a culture medium (pH 7) of the above composition was inoculated 100 ml. of the culture of *Bacillus licheniformis* IAM 11054 preincubated over night in the same medium. Shaking culture was conducted for 6 hours at 30° C., whereupon the bacteria were collected by centrifugal separator in the form of a wet cake and then suspended in a 0.05 M of buffer solution of phosphoric acid (pH 7) in a concentration of 20% by weight of the wet cake. The suspension was treated with ultra sonic oscillation at 20 kc. for 10 minutes to prepare a liquid of disintegrated bacteria, which was used as an enzyme solution.

Subsequently, the resultant enzyme solution was mixed with a mixture of UDP-glucose, NAD and glycine buffer (pH 9.5) in a ratio of 4:6 by volume to produce a mixture containing 6.4 mM. of UDP-glucose, 1 mM. of NAD and 0.1 mM. of glycine buffer, and the resultant mixture was aerobically reacted at a pH of 7.5 to 9.5 and at 30° for 20 hours.

The reaction mixture was treated with charcoal to cause the resulting UDP-glucuronic acid and other uracil derivatives to be adsorbed to the charcoal, this being followed by elution with ammoniacal ethanol and subsequent concentration. The concentrated eluant was then passed through a column of an ion exchange resin, "Dowex 1" (trade mark, the same as defined before), and developed with 0.01 N HCl containing 0.1 M of NaCl for fractionation. The resulting UDP-glucuronic acid-containing fraction was treated with charcoal again and then concentrated, whereby 23.4 mg. of purified UDP-glucuronic acid was produced from 10 ml. of the reaction mixture.

The results of analysis of the purified product are given in Table 2, which show that the product contains 2 molecules of phosphoric acid (one of which is acid-labile P) and 1 molecule of glucuronic acid per molecule of uracil base. Thus the product is identical with pure UDP-glucuronic acid in structure.

TABLE 2

[Analysis values (mole) per mole of uracil]

| | Phosphoric acid | | | Method of quantitative analysis of glucuronic acid | |
|---|---|---|---|---|---|
| | Inorganic P | Acid-labile P | Organic P | Carbazole-sulfuric acid method [2] | Naphtho-resorcinol method [3] |
| Found | 0 | 0.92 | 1.94 | 0.94 | 0.99 |
| Calculated [1] | 0 | 1.00 | 2.00 | 1.00 | 1.00 |

[1] Calculated as UDP-glucuronic acid.
[2] The method being described in T. Bitter and H. M. Muir, Anal. Biochem., 4 330 (1962)
[3] The method being described in I. Nir, Anal. Biochem., 8, 20 (1964)

The purified product having the above values reacted with o-aminophenol in the presence of UDP-glucuronyl transferase prepared from the liver of mouse to form o-aminophenyl glucuronide showing an ability to effect conjugation with glucuronic acid. This is apparent from the fact that the product has an ability to produce azo pigment nearly equivalent to that of the reference UDP-glucuronic acid (product of Sigma Chemical Co., U.S.A.) employed as a control, as indicated by the absorbance at OD 550 mμ listed in Table 3 (G. J. Dutton and I. D. E. Storey, Methods in Enzymol., vol. 5, 1962, page 159, Academic Press). From these findings, the product of this invention was identified as UPD-glucuronic acid.

TABLE 3

| Samples | Amount used μg. | OD 550 mμ |
|---|---|---|
| Reaction product | 258 | 0.175 |
| Controls: | | |
| UDP-glucuronic acid [1] | 248 | 0.189 |
| UDP-glucose [1] | 2,038 | 0 |

[1] Product of Sigma Chemical Co., U.S.A.

EXAMPLE 2

UDP-glucuronic acid was produced in the same manner as in Example 1 except that NAD was used in varying amounts as listed in Table 4 below, with the reaction conducted for 3 hours and 20 hours respectively. The conversion of the starting UDP-glucose to the resultant UDP-glucuronic acid is given in Table 4.

TABLE 4

| Concentration of NAD (mM.) | Conversion (percent) | |
|---|---|---|
| | 3 hours | 20 hours |
| 0 | 9.4 | 30.6 |
| 0.0625 | 21.3 | 56.3 |
| 0.125 | 26.9 | 68.1 |
| 0.25 | 33.8 | 73.8 |
| 0.5 | 40.6 | 75.0 |
| 1 | 46.3 | 78.8 |
| 2 | 47.5 | 74.4 |
| 8 | 45.0 | 73.1 |

EXAMPLE 3

UDP-glucuronic acid was produced in the same manner as in Example 1 except that 8 mM. of NADP was used in place of 1 mM. of NAD and glycine buffer of pH 9.0 was used in place of that of pH 9.5. The conversion of the starting UDP-glucose to the resultant UDP-glucuronic acid was given below, in which the result obtained when NADP was not used is also shown.

TABLE 5

| Concentration of NADP (mH.): | Conversion (percent) |
|---|---|
| 0 | 20.7 |
| 8 | 37.3 |

EXAMPLE 4

*Bacillus licheniformis* IAM 11054 was inoculated on a culture medium of the same composition as in Example 1, and shaking culture was conducted at 37° C. for 6 hours to prepare raw bacteria, which were then aerobically reacted with UDP-glucose at pH 7.5 to 9.5 and at a temperature of 30° C. for 20 hours in the presence of 8 mM. of NAD. The resulting product was then purified in the same manner as in Example 1 to obtain 0.6 mg. of UDP-glucuronic acid from 3.5 mg. of UDP-glucose.

EXAMPLE 5

*Bacillus licheniformis* IAM 11054 was cultured in the same manner as in Example 4 to prepare raw bacteria, which were then placed in a desiccator containing concentrated sulfuric acid under a reduced pressure for rapid drying. The dried bacteria were reacted with UDP-glucose under the same conditions as in Example 4, and the product was purified in the same manner as in Example 1 to prepare 1.6 mg. of UDP-glucuronic acid from 3.5 mg. of UDP-glucose.

EXAMPLE 6

A liquid of disintegrated bacteria of *Bacillus licheniformis* NIAH 157 prepared in the same manner as in Example 1 by cultivation was reacted with UDP-glucose under the same conditions as in Example 4, and the resulting product was then purified in the same manner as in Example 1 to obtain 25 mg. of UDP-glucuronic acid from 36 mg. of UDP-glucose.

EXAMPLE 7

A liquid of disintegrated bacteria of *Bacillus licheniformis* AHU 1531 prepared in the same manner as in Example 1 by cultivation was reacted with UDP-glucose under the same conditions as in Example 4, and the resulting product was then purified in the same manner as in Example 1 to obtain 22 mg. of UDP-glucuronic acid from 35 mg. of UDP-glucose.

EXAMPLE 8

A liquid of disintegrated bacteria of *Bacillus cereus* IFO 3001 prepared in the same manner as in Example 1 by cultivation was reacted with UDP-glucose under the same conditions as in Example 4, and the resulting product was then purified in the same manner as in Example 1 to obtain 3 mg. of UDP-glucuronic acid from 35 mg. of UDP-glucose.

EXAMPLE 9

A liquid of disintegrated bacteria of *Bacillus licheniformis* NIAH 215 prepared in the same manner as in Example 1 by cultivation was reacted with UDP-glucose in the same manner as in Example 4 to obtain 10 mg. of UDP-glucuronic acid from 36 mg. of UDP-glucose.

EXAMPLE 10

A liquid of disintegrated bacteria of *Bacillus licheniformis* AHU 1532 prepared in the same manner as in Example 1 by cultivation was reacted with UDP-glucose in the same manner as in Example 4 to obtain 19 mg. of UDP-glucuronic acid from 36 mg. of UDP-glucose.

What we claim is:

1. A process for manufacturing uridine-5'-diphosphoglucuronic acid which comprises cultivating a strain belonging to the genus Bacillus which is capable of producing uridine-5'-diphosphoglucose dehydrogenase to produce uridine-5'-diphosphoglucose dehydrogenase and reacting the resultant uridine-5'-diphosphoglucose dehydrogenase with uridine-5'-diphosphoglucose to produce uridiene-5'-diphosphoglucuronic acid.

2. The process according to claim 1, in which said strain belonging to the genus Bacillus is a strain belonging to one species selected from the group consisting of *Bacillus licheniformis* and *Bacillus cereus*.

3. The process according to claim 2, in which said strain is a strain belonging to *Bacillus licheniformis*.

4. The process according to claim 2, in which said strain is a strain belonging to *Bacillus cereus*.

5. The process according to claim 2, in which said strain is one member selected from the group consisting of *Bacillus licheniformis* IAM 11054, *Bacillus licheniformis* NIAH 157, *Bacillus licheniformis* AHU 1531, *Bacillus licheniformis* NIAH 215, *Bacillus licheniformis* AHU 1532 and *Bacillus cereus* IFO 3001.

6. The process according to claim 1, in which at least one nucleotide compound of nicotine adenine dinucleotide and nicotine adenine dinucleotide phosphate is added in an amount of 0.05 to 20 mM. to a reaction system of between uridine-5'-diphosphoglucose dehydrogenase and uridine-5'-diphosphoglucose.

7. The process according to claim 6, in which said nucleotide compound is nicotine adenine dinucleotide.

References Cited

J. Biol. Chem., vol. 224, pp. 79–90 (1957).

ALVIN E. TANENHOLTZ, Primary Examiner